United States Patent
Stolzer

(10) Patent No.: US 6,901,832 B2
(45) Date of Patent: Jun. 7, 2005

(54) METHOD AND APPARATUS TO REMOVE PIECES CUT FROM A BAR-SHAPED WORKPIECE WITH A CUTTING MACHINE

(75) Inventor: Armin Stolzer, Buhlertal (DE)

(73) Assignee: EURO Besitz GmbH & Co. EDV-Dienstleistungs KG, Achern (DE)

( * ) Notice: Subject to any disclaimer, the term of this patent is extended or adjusted under 35 U.S.C. 154(b) by 307 days.

(21) Appl. No.: 10/104,400

(22) Filed: Mar. 22, 2002

(65) Prior Publication Data
US 2002/0152859 A1 Oct. 24, 2002

(30) Foreign Application Priority Data
Mar. 22, 2001 (DE) .......................................... 101 14 263

(51) Int. Cl.⁷ .............................. B26D 7/06; B26D 7/32
(52) U.S. Cl. ..................... 83/23; 83/29; 83/91; 83/153; 83/157; 83/160; 83/277
(58) Field of Search ...................... 83/704, 705, 404.2, 83/152, 156, 23, 157, 277, 467.1, 153, 154, 29, 42, 86–87, 94, 151, 160, 90, 91, 282, 158, 159, 161, 206; 198/411, 412, 409; 438/458, 460; 414/935, 225.01, 226.01, 226.02, 540–541, 545–546, 639, 677, 682, 743, 744.1, 744.2–744.7, 745.1, 749.1, 753.1, 754, 758, 757, 779, 782, 783, 802, 816

(56) References Cited

U.S. PATENT DOCUMENTS

| | | | | | |
|---|---|---|---|---|---|
| 3,182,538 | A | * | 5/1965 | Whitmore et al. | 83/241 |
| 3,504,585 | A | * | 4/1970 | Harris | 83/42 |
| 3,956,518 | A | * | 5/1976 | Goldbach | 426/518 |
| 3,965,783 | A | * | 6/1976 | Muller et al. | 83/88 |
| 4,252,040 | A | * | 2/1981 | Kiefer | 83/42 |
| 4,342,240 | A | * | 8/1982 | Gaiser et al. | 83/42 |
| 5,060,547 | A | * | 10/1991 | Moriya et al. | 83/210 |

FOREIGN PATENT DOCUMENTS

| | | |
|---|---|---|
| DE | 2816497 A1 | 10/1979 |
| DE | 2921194 A1 | 12/1980 |

* cited by examiner

Primary Examiner—Boyer D. Ashley
(74) Attorney, Agent, or Firm—Volpe and Koenig, P.C.

(57) ABSTRACT

A method to remove pieces (14) cut off from bar-shaped workpiece material (5) by a cutting machine (1) is provided as well as an apparatus to carry out this process, wherein the piece (14) of the material (5) to be cut lies on a machine table (7) during cutting behind the cutting plane (8) in the direction of feed (9) of the material (5), is gripped between gripping jaws (12, 13) from behind the cutting plane (8) only. At the end of the cut, the cut off piece (14) is moved away from the cutting plane (8) by the gripping jaws (12, 13) in the material feed direction (9) and is tilted about an axis perpendicular to the material feed direction (9) such that its most recently cut surface is essentially horizontal and directed downward and that the piece (14) is then discharged by the gripping jaws (12, 13) by an essentially vertical motion downward onto an offload table (21).

5 Claims, 14 Drawing Sheets

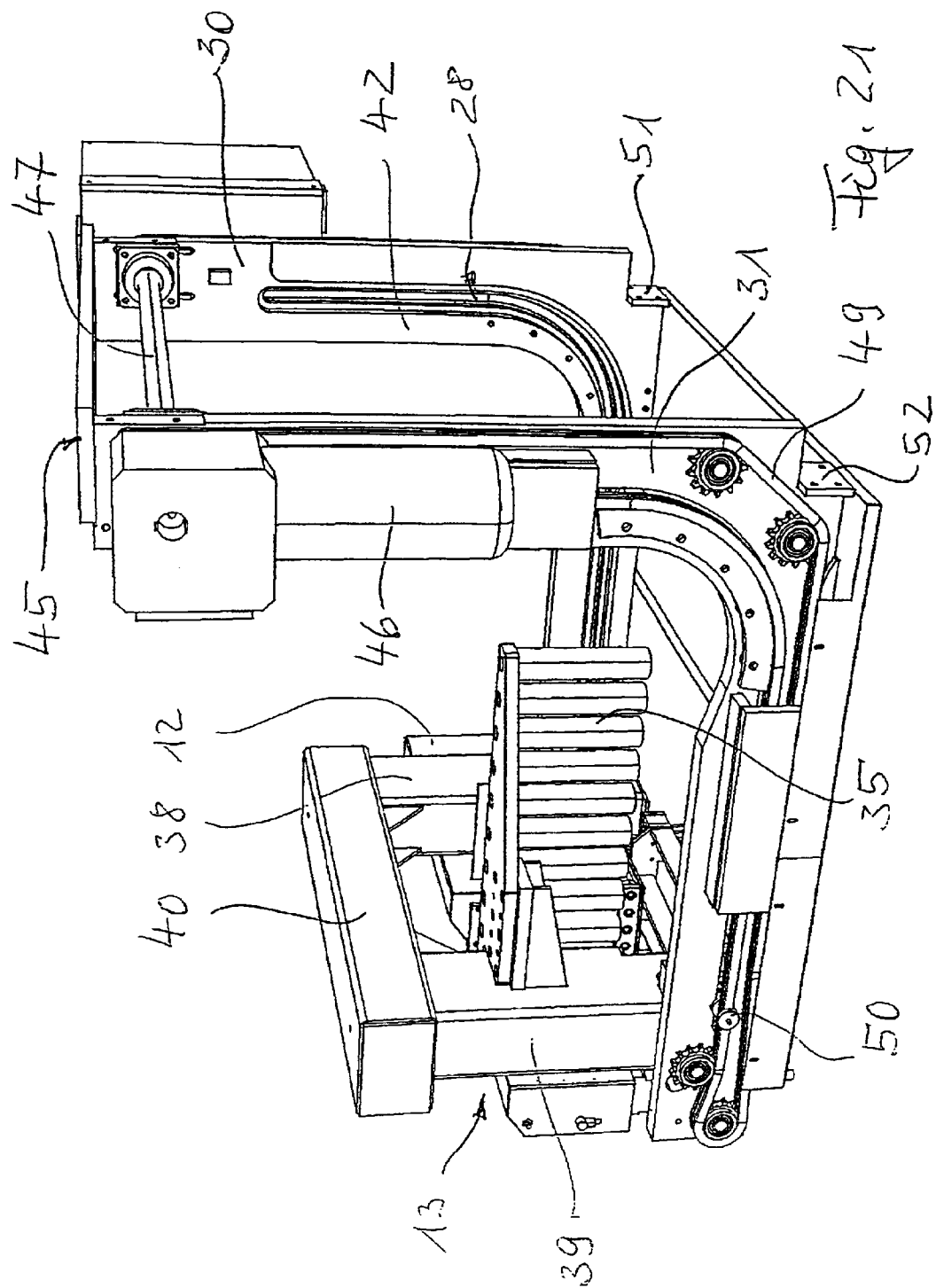

METHOD AND APPARATUS TO REMOVE PIECES CUT FROM A BAR-SHAPED WORKPIECE WITH A CUTTING MACHINE

BACKGROUND

This invention pertains to a method to remove pieces cut from a bar-shaped workpiece material by a cutting machine. The piece of the material to be cut off that lies behind the cutting plane in the direction of feed of the material is only gripped behind the cutting plane between gripping jaws as it lies on a machine table during the cut. Also, this invention pertains to an apparatus to carry out this process.

Possible cutting machines in this case are hacksaws, cold circular saws, band saws or similar.

In known processes and apparatuses of the type mentioned above, the material to be processed lies on the machine table and on a feed unit that is placed in front of it in the direction of material feed. In the process, the material is fed between cutting steps by means of at least two feed jaws that can be opened and closed perpendicular to the material feed direction and that can be shifted, if necessary through automatic controls, toward the feed unit and moved directly up against the cutting plane. These feed jaws are opened immediately after the material is fed and the gripping jaws are closed, but never after the cutting step is over, they are shifted away from the cutting plane by a distance equal to the stroke of the next workpiece and then closed again.

In this manner, the material can be immediately fed by the amount of the material length to be cut next after the cutting step has ended, and thus after the attendant opening of the gripping jaws, with the material piece just cut being removed from the cutting plane by the material behind it. Another process and associated apparatus involves the gripping jaws being able to traverse the cutting plane opposite to the direction of material feed so as to then grasp the workpiece material and to move it forward by the amount of the material section to be cut off next. In this case, however, the gripping jaws also stay behind the cutting plane, as viewed in the material feed direction, at all times during the cut. In this case, the jaws located in front of the cutting plane in the material feed direction can be fixed in the material feed direction, or they can share the feed work with the gripping jaws.

This invention relates to both methods as described above.

In these methods, longer cuts of material pieces can then be further processed by a sorting unit downstream of the cutting machine in the direction of feed, for example they can be shifted perpendicular to the direction of feed and be collected. For short material sections or slices, however, this kind of handling is not possible due to the lack of positional stability of short pieces, resulting in short pieces of this type only being dropped or transferred directly behind the cutting machine in a relatively haphazard fashion or dropped from the sorting unit into containers. Thus, to continue processing these short material pieces, they must be taken by hand from the containers, which is relatively cumbersome, and taken to further processing stations. This no longer meet modern requirements, which require automatic and ordered delivery of short material pieces as well so that these pieces can be automatically forwarded for further processing immediately.

SUMMARY

The object of this invention is thus to further develop a method and an apparatus of the type mentioned above so that short material pieces can be handled after being cut in a specific fashion and be collected or stacked so that they are prepared in an ordered form, if necessary even in different sizes, to be taken from the cutting machine using suitable means, such as pallets, and forwarded for further processing. This object is to be met in as simple and compact a manner as possible using the means already present at the cutting machine.

With the method of the type mentioned above as a starting point, this object is met according to the invention by moving the cut piece away from the cutting plane in the material feed direction at the end of the cut using the gripping jaws and by tilting it about an axis lying perpendicular to the material feed direction such that its most recently cut surface is essentially horizontal and directed downward and that the piece is then discharged onto an offload unit by the gripping jaws through a motion that is directed essentially vertically downward.

To this end, the apparatus according to the invention is designed such that at the end of the cut the gripping jaws, together with the cut piece held between them, can travel along a guide track in the material feed direction away from the cutting plane, and can be tilted about an axis perpendicular to the material feed direction in such a way that the most recently cut surface of the cut piece can be discharged onto an offload table by opening the gripping jaws. It is also designed so that the gripping jaws can then return along the guide track to their position next to the cutting plane and that the next following material piece to be cut can be gripped by the gripping jaws.

In the process, of course, all steps made by affected machine parts should be determined and checked against specific design positions using automatic controls in the system that contains the cutting machine, and adjustments should be made if necessary. This applies to all measures and motions described below. Therefore, it is not necessary to constantly point out, one at a time, the existence of this kind of automatic control system for the individual processes that are to follow.

These measures result, then, in the short material pieces no longer being pushed forward by the material behind it alone and in their no longer being subject to a high degree of randomness in their positioning. Now, the material pieces remain in their held position between the gripping jaws, and they are moved by them away from the cutting plane and placed exactly at a predetermined position onto an offload table so that they can be further processed from then on precisely and along predetermined paths in a manner to be described more closely. This remedies any lack of order of short material pieces occurring downstream of the cutting machine. Moreover, this disorder is replaced by a predetermined arrangement that permits these short material pieces to be further processed in as automatic a manner as possible.

This solution is made possible by designing the gripping jaws to travel or move in the manner prescribed by the invention and by giving them, in addition to the function of gripping the workpiece material during the cutting step, the further task of ordered removal of the shorter material piece. On the other hand, however, the known process up to this point, useful as always for long material pieces, is not compromised or changed by this measure. This is because if long material pieces are to be cut, the original known task of gripping the material piece next to the cutting plane with the gripping jaws can remain.

The motion of the gripping jaws according to the invention in the material feed direction and away from the cutting plane can be implemented by a straight motion in the material feed direction. The gripping jaws are then tilted downward about a horizontal axis perpendicular to the material feed direction during this motion such that the most recently cut surface—based on time—of the material piece held by the gripping jaws points downward, allowing the material piece to then be discharged onto an offload table whose height is adjusted accordingly.

It has been proven particularly useful, however, to provide the guide track with an essentially horizontal section extending in the material feed direction, a section connected to it that is curved upward, and a section connected to that is essentially vertical. In this way, it is the shape of the guide track that makes sure the gripping jaws are moved, together with the material piece held by them, away from the cutting plane of the cutting machine and are tilted by 90° as a result of their moving along the curved section of the guide track. In this manner, the essentially horizontal section of the guide track can be designed to slope upward away from the cutting machine such that the gripping jaws will not collide with an offload table that could be located next to and at the same height as the machine table. The continued motion of the gripping jaws along the vertical section of the guide track then allows placement of the material piece onto an offload table in a manner to be described below. The height of the bearing surface of this offload table can be the same as the level of the machine table as well so that use can also be made of the offload table in a manner to be described below if long material pieces are to be further transported in the material feed direction in a conventional form after the cut is finished.

As for the length of the essentially horizontal section of the guide track, it must of course be selected so that the gripping jaws come away far enough from the cutting machine that they reach a position that allows the offload table to be suitably placed.

On the other hand, as for the length of the essentially vertical section of the guide track, it must be selected taking into account two points of view. One point of view is that of the space requirements of the gripping jaw predetermined when it is tilted downward, together with the material piece, during the motion along the curved section of the guide track. In addition to this, the vertical section of the guide track must, in the case of an offload table at the same level as the machine table, allow the gripping jaws to move upward far enough until the most recently cut surface of the material piece held by the gripping jaws is higher than the surface of the offload table so that the material piece can then be placed by the gripping jaws onto the offload table by moving the gripping jaws along the vertical section of the guide track a sufficient amount back downward. The other point of view requires the simultaneous consideration of the possibility of further developing the process according to the invention to account for a number of short material pieces of the same type having to be laid on top of one another in a stack on the offload table. To correspond with the desired maximum stack height, the length of the vertical section of the guide track must be dimensioned accordingly. The total length of the vertical guide track therefore is the result of the addition of each of these required lengths of the vertical section of the guide track in taking into account both criteria above.

For purposes of practicality, it has also been shown to be useful to connect the guide tracks to the frame of the cutting machine behind the cutting plane in the material feed direction, one for each gripping jaw. Here, the guide tracks associated with each of the gripping jaws can be provided as slots in coulisse walls that are attached to the frame of the cutting machine.

On the other hand, it is also useful to locate the gripping jaws at a support that extends essentially perpendicular to the material feed direction and lies outside the area of maximum workpiece cross section. In this manner, the gripping jaws can be located on the support and the longitudinal ends of the support can each be moveably engaged with one of the guide tracks associated with the gripping jaws. Another possibility is that the gripping jaws are each located below the support above a vertical upright and that the free lower ends of the uprights are each moveably engaged with one of the guide tracks associated with the gripping jaws. Which of these two possibilities is used depends on the particular design and thus on the circumstances of the individual case. Splitting the guide track into two guide tracks located on each side of the gripping jaw unit results in stabilizing of the gripping jaw unit in any case against tipping, and the two equal parts of the guide track lie outside the area of movement of the bar material when it is fed so that the normal process by the system with the cutting machine in cutting longer material pieces is not limited or hindered in any way.

Going into more detail, the above embodiment can involve the moveable engagement being accomplished through rolls that rotate at the longitudinal ends of the support or at the free ends of the uprights and that cooperate with the walls of the slots and with the coulisse walls.

In order to produce the motion of the gripping jaws and the unit comprised of them along the guide track, common known methods can be used to for this purpose. However, it has been shown to be useful to connect together the coulisse walls beyond the upper end of the essentially vertical piece of the guide track using a horizontal bridge that extends perpendicular to the material feed direction, to install a rotating motor-driven shaft in the bridge, to support a return pulley on the shaft for a drive means that winds around its associated guide track on the outside of each of the coulisse walls opposite the gripping jaws, and to at least directly connect, using the drive means, the longitudinal ends of the support or the ends of the uprights to produce the motion of the gripping jaws between their position assumed during the cutting of the material on the one hand and that of the discharge a cut piece onto the offload table on the other.

As for the offload table for the ordered offloading of the material pieces, a design can be used here with a surface that can be raised and lowered to give the gripping jaws and the material piece held by them enough freedom for their motion along the guide track, and on the other hand to discharge the material piece onto the offload table when it is raised. However, it has been shown to be especially useful to align the surface of the offload table with the surface of the machine table and to make the offload table horizontally moveable by a drive unit in the feed direction of the material and longitudinally positionable between a position directly adjacent to the machine table and a position at a distance from it at which its abutting edge facing the machine table is behind the end of the coulisse walls as seen in the direction of the material feed.

At this position, therefore, the surface of the offload table is located at the level of the workpiece on the machine table. So as to now provide the gripping jaws and the material piece held by them enough freedom of motion to move along the guide track, the offload table is moved to the far position from the machine table mentioned. If the unit containing the gripping jaws is then located at the end of its motion on the vertical section of the guide track, and if it is then raised above the level of the material on the machine table, the offload table is moved to its position directly adjacent to the machine table, and thus below the gripping jaws, so that the gripping jaws can discharge the material piece onto the offload table. Then, the gripping jaws on the vertical section of the guide track can again be moved a bit upward and the offload table can be returned to its position removed from the machine table so that the gripping jaws can again be moved back to their position next to the cutting plane along the guide track. These movements are not absolutely necessary, however. The horizontal mobility of the offload table in the material feed direction thus enables the unhindered cyclical motion of the gripping jaws along the guide track. On the other hand, for a normal process by the system containing the cutting machine, i.e. to cut longer material pieces, it is also possible to move the offload table to its position adjacent to the machine table or to a position between the two extreme points mentioned so as to provide longer pieces of bar have sufficient support and bearing surface on their way away from the cutting plane.

However, the mobility of the offload table mentioned at positions between its two extreme positions has yet another use in discharging short material pieces in that these types of pieces can then also be discharged next to one another individually as seen in the material feed direction or into stacks by adjusting the offload table accordingly, in a controlled manner, at different positions for the discharge of the material pieces. This provides the possibility, as mentioned, of discharging material pieces next to one another on the offload table as seen in the material feed direction, and thus to better utilize its surface area.

Concerning the design details, it has been proven to be advantageous to design the offload table using a driven roller conveyor that moves back and forth located on a fixed table frame. The rolls rotate about horizontal axes that are perpendicular to the material feed direction. In this manner, it is also advantageous if the roller conveyor has a narrow roll separation so as to provide sufficient bearing surface for smaller material pieces as well, and to convey them longitudinally on the roller conveyor.

So as to now free the system containing the cutting machine again for a different process after having discharged material pieces onto the offload table in the manner prescribed by the invention, and to make space for the offloading of further material pieces after filling the offload table with material pieces, the process according to the invention can be further developed to transport the material pieces from the offload table. This can be accomplished by providing the table frame with a table plate on at least one side next to the offload table in its position moved away from the machine table as well as by providing a motor-driven slide gate for the workpieces on the offload table that moves horizontally, perpendicular to the material feed direction. The slide gate can travel from a remote position on the side of the offload table opposite the table plate to a position near the edge of the table plate away from the offload table. With the help of this slide gate, the material pieces can thus be pushed from the offload table onto the table plate, wherein this slide gate must also be provided with the ability to be arbitrarily stopped at different positions above the table plate so that material pieces or multiple lots of material pieces can be positioned in the direction of motion of the slide gate next to one another on the table plate.

Then, the material pieces, or stacks of them, can be forwarded from the table plate in a conventional manner for further processing, for example by designing the table plate to be exchangeable with a pallet, with the pallet being removed in a known fashion after being filled and then being replaced by an empty one.

It is helpful to design the slide gate such that its effective surface (for table plates located on both sides of the offload table, this includes both effective surfaces of the slide gate) is formed by a roller conveyor extending in the material feed direction whose rolls rotate about vertical axes that are perpendicular to the material feed direction. Here, as well, it is helpful if the roller conveyor has a narrow roll separation.

Similarly, the gripping jaws can be designed so that one gripping jaw is fixed perpendicular to the material feed direction and the other can shift to open and close the gripped condition. However, there is also the possibility of making one gripping jaw releasable by means of a short stroke motion away from the workpiece material perpendicular to the material feed direction and making the other gripping jaw able to shift so as to open and close the gripped condition. Here, the short stroke of the first gripping jaw away from the workpiece material ensures that when the gripping jaws return to their gripping position next to the cutting plane, the first gripping jaw cannot collide with the workpiece material that may have been further fed in the meantime by the feed jaws. In a further development of these constructions, a roller conveyor can be supported off of the fixed gripping jaw, or the one that moves with the short stroke, said conveyor extending out away from the cutting plane of the cutting machine. The rolls of this roller conveyor rotate about axes that are vertical and perpendicular to the material feed direction, wherein the vertical width of the roller conveyor corresponds to the height of its associated gripping jaw and its length essentially corresponds to the extension of the coulisse walls in the material feed direction. This provides a guide track to remove cut material pieces in the cutting of longer material pieces that is adjacent to the gripping jaw that is fixed perpendicular to the material feed direction, or the one that moves with a short stroke. This guide track can be supplemented by the slide gate having the design described above by then placing the slide gate in a position where its roller conveyor lines up with the roller conveyor connected to the fixed gripping jaw.

BRIEF DESCRIPTION OF THE DRAWINGS

Further important features and details of the invention can be found in the following description of preferred embodiments that are shown in the drawings. In the drawings:

FIG. 21 is a perspective view according to FIG. 20 in a side view, with covers partially removed.

DETAILED DESCRIPTION OF THE PREFERRED EMBODIMENTS

Figure 1:
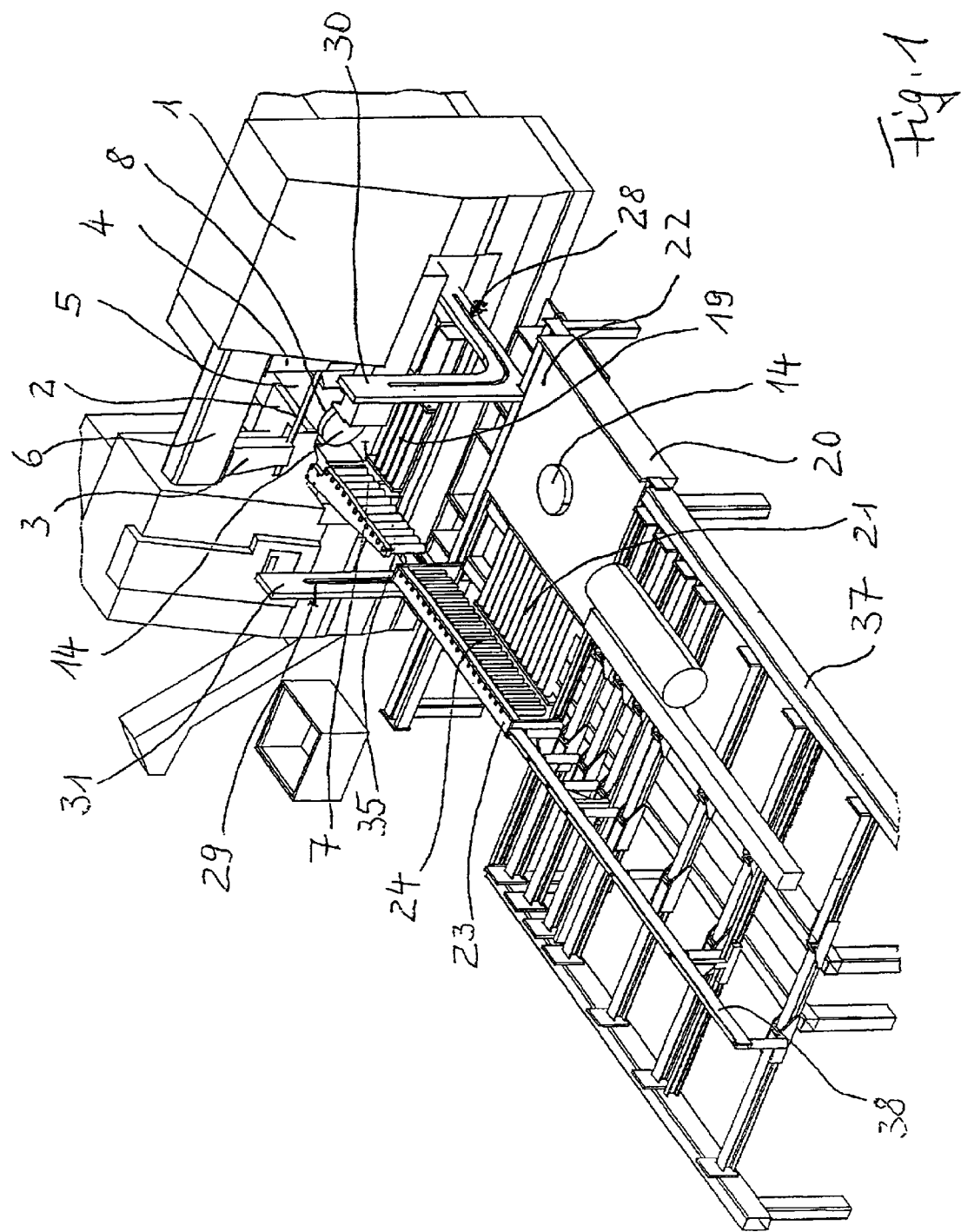
FIG. 1 is a perspective top view of the material discharge side of a system containing a cutting machine for bar-shaped material.
Figure 2:
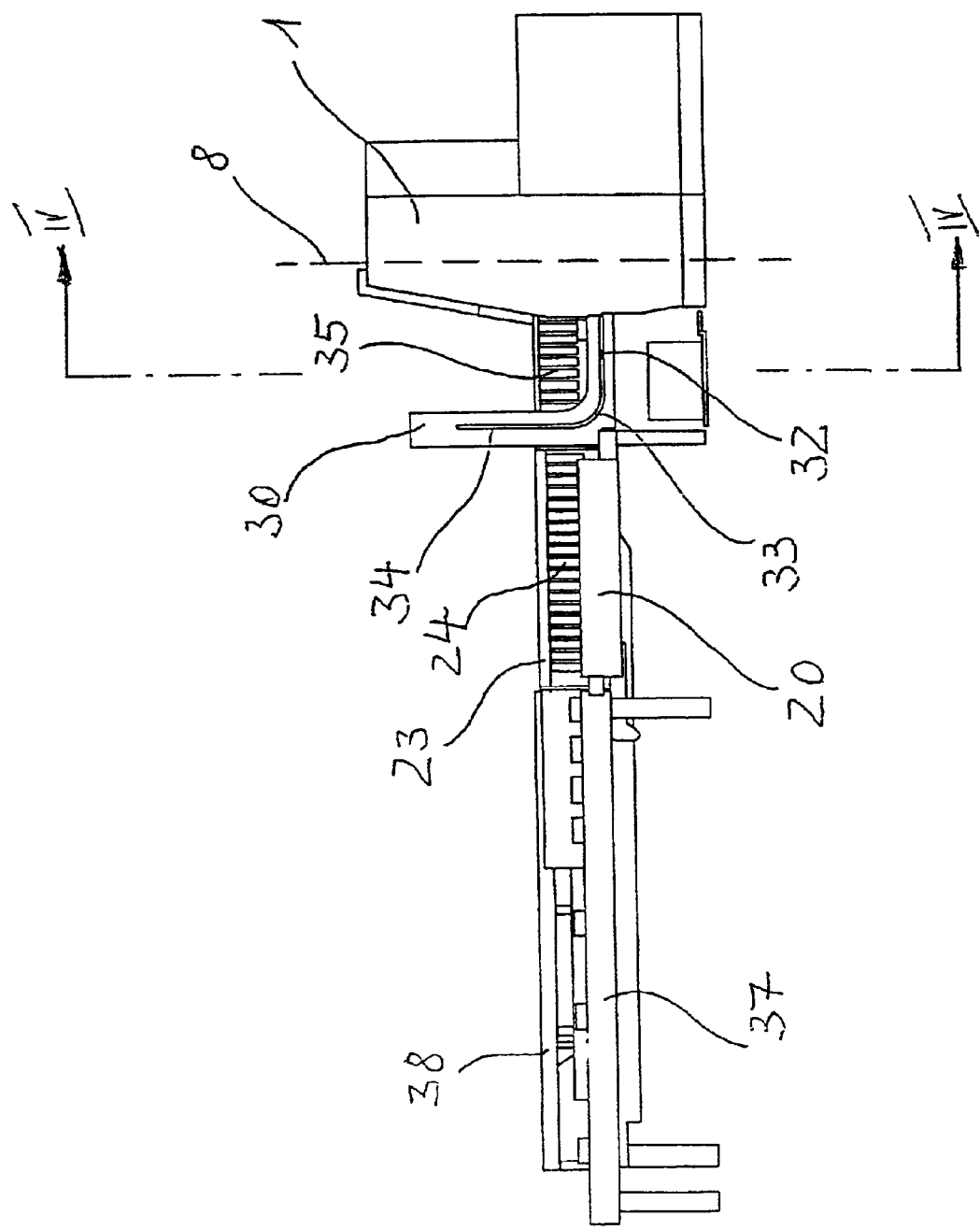
FIG. 2 is a side view of the system according to FIG. 1.

FIGS. 1 through 4 illustrate a system with a cutting machine 1 in the form of a horizontal band saw in which the lower horizontal strip 2 of the saw band, which circulates in a know fashion, is tilted to the vertical cutting plane by means of saw band guides 3, 4. The saw band guides 3, 4 are held in a horizontal support 6 in a manner that is horizontally adjustable according to the cross sectional area of the bar-shaped workpiece material 5. This support 6 can travel vertically together with the saw band and its return pulleys, which are contained in the frame of the cutting machine 1 but not shown, to execute the cutting step.

Figure 3:
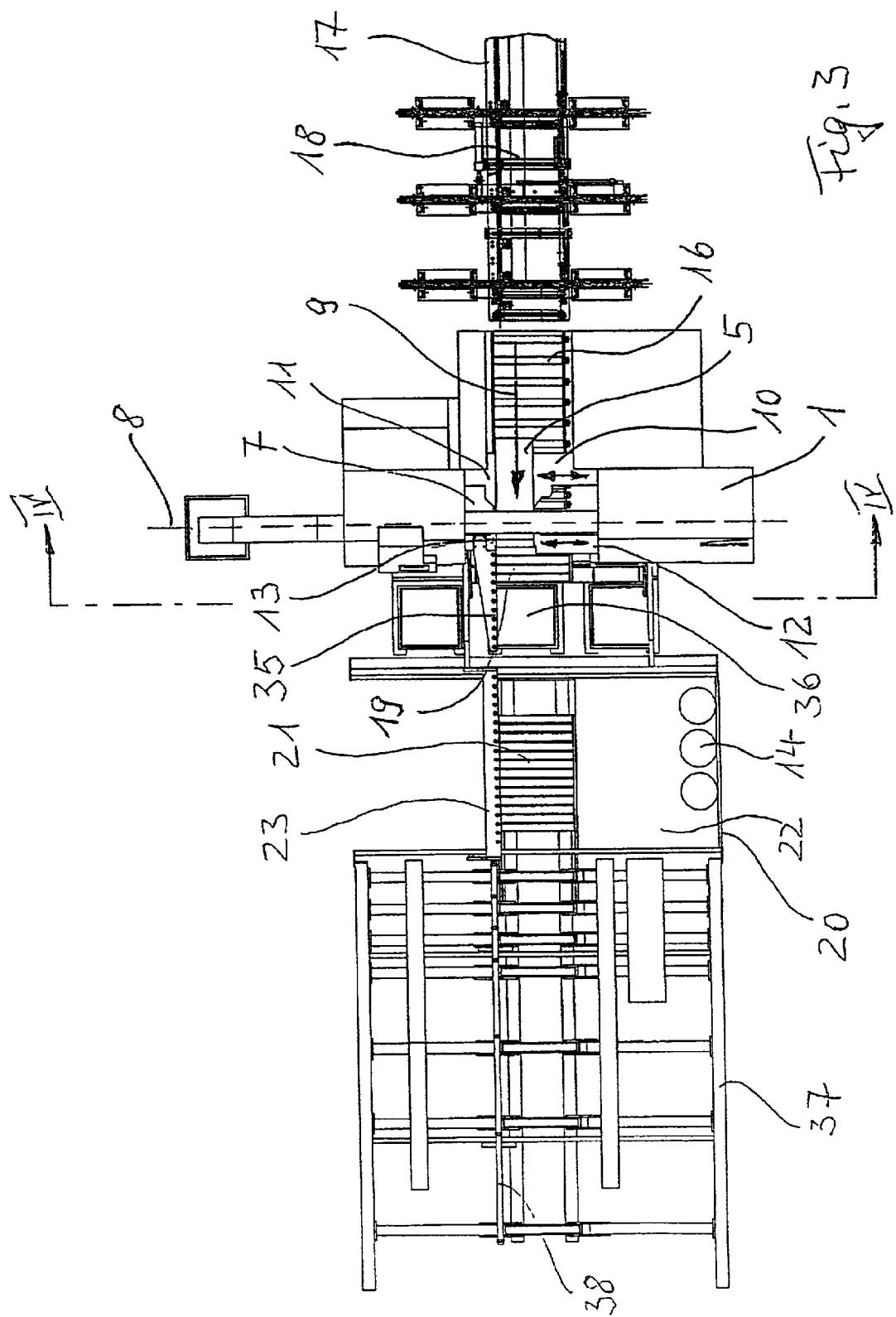
FIG. 3 is a plan view of the system according to FIG. 1.

The workpiece material 5 sits near the cutting machine 1 on a machine table 7 and is held there during the cutting step on both sides of the cutting plane 8, which is indicated on the workpiece material 5 in FIG. 1 and by a dashed line in FIG. 3, by chucks. In front of the cutting plane 8 in the material feed direction 5 indicated in FIG. 3 by arrow 9, these chucks consist of feed jaws 10, 11 that are horizontal and that open and close perpendicular to the feed direction 9 of the material. In the material feed direction 9 after the cutting plane 8, these chucks consist of gripping jaws 12, 13 that are horizontal and open and close perpendicular to the direction of feed 9.

Figure 4:
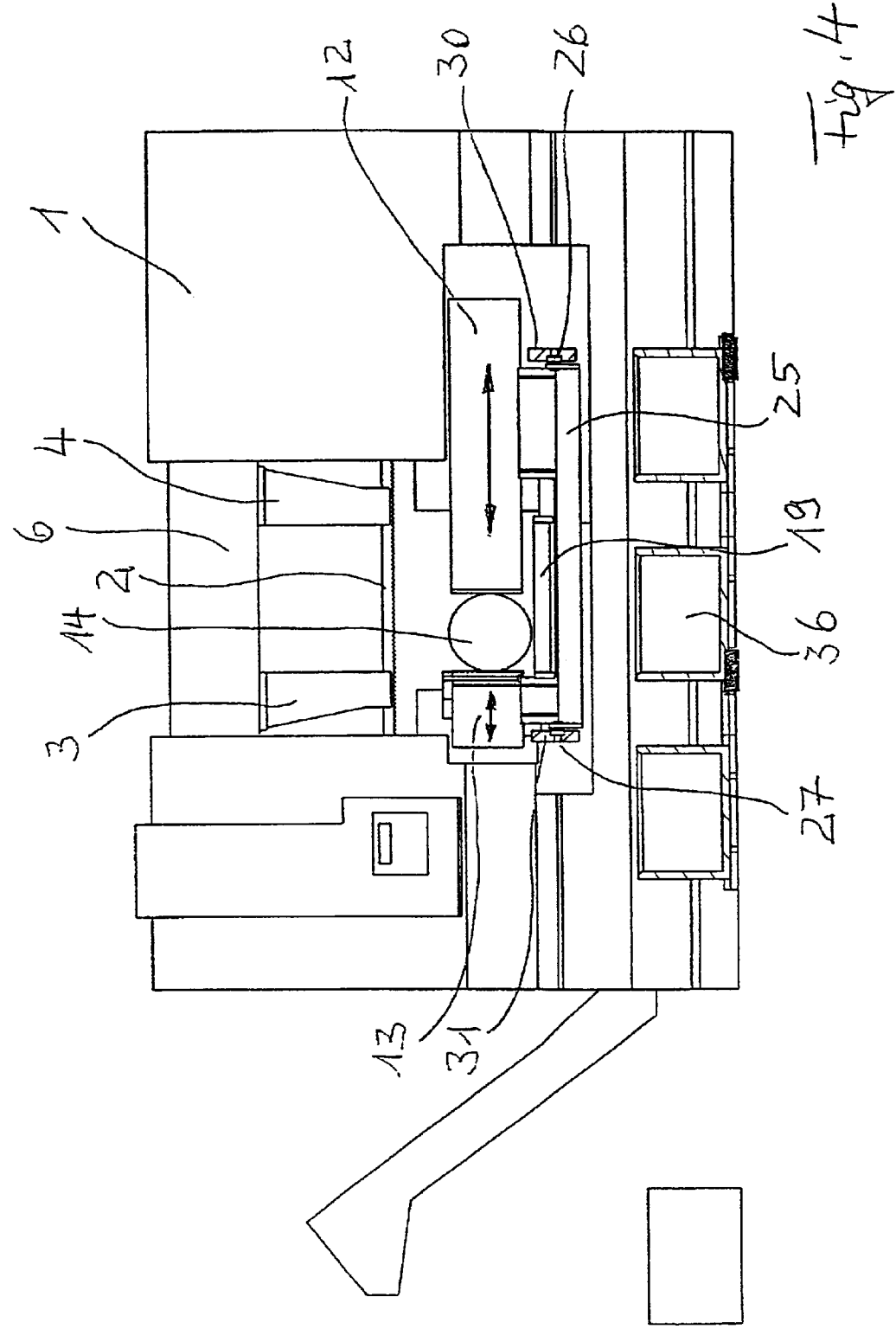
FIG. 4 is a sectional view taken along line IV—IV in FIG. 2 and FIG. 3.

The feed jaws 10, 11 can also travel parallel to the material feed direction 9 outside of the frame of the cutting machine 1 in order to feed the material 5 by the length at which the respective material piece is to be cut. In this manner, the process is designed so that the feed jaws 10, 11 are opened before a cutting step has ended, but preferably just prior to the beginning of another cutting step, they are moved back in the opposite direction to that of the material feed 9 by the length of the material piece to be cut next, and closed again to grip the material 5 while the material piece just being cut identified by 14 in FIGS. 1 and 4 is held by gripping jaws 12, 13. If, then, the cutting step has ended and the saw band 2 has been raised again upward from the workpiece cross section, the material is fed by feed jaws 10, 11 by the length of the material piece to be cut next.

Figure 19:
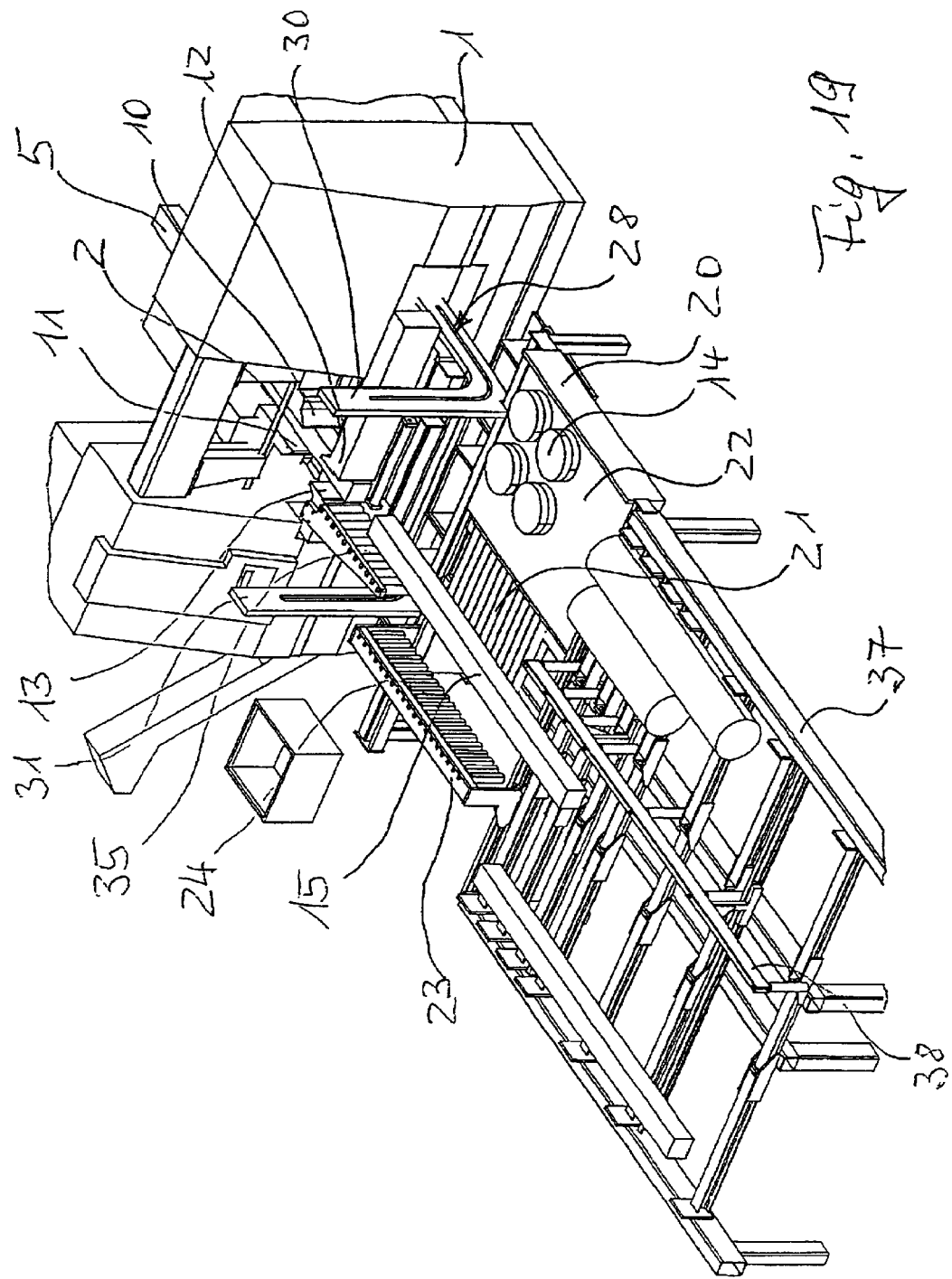
FIG. 19 is a view according to FIG. 1 which illustrates the handling of long workpieces.

In this way, there are two possibilities for handling the previously cut material piece. If, as shown in particular in FIG. 1, a short material piece 14 has been cut, it is cleared by gripping jaws 12, 13, in a manner to be described below, before the material 5 is fed by the feed jaws 10, 11 by the amount of the material piece to be cut next. If, however, as seen in FIG. 19, a long material piece 15 has been cut, one only has to open the gripping jaws 12, 13 after the cutting step has ended and the material is then fed using the feed jaws 10, 11, with the previously cut material piece 15 being pushed forward by the feed material, in order to then be cleared in a manner also to be described further.

In both cases, the gripping jaws 12, 13 are closed again after the material 5 is fed by the feed jaws 10, 11 by the length of the material piece to be cut next, and the process described above begins again for the feed jaws 10, 11. It must also be determined in this regard that the material 5 is being held on both sides of the cutting plane 8 by both the feed jaws 10, 11 as well as the gripping jaws 12, 13 according to the process described above at least before the end of the cutting step, but preferably during the entire cutting step.

As seen further in FIGS. 1 through 4, the system containing the cutting machine 1 includes a roller conveyor 16 held by the frame of the cutting machine 1 on the material feed side adjacent to the machine table 7 on which to place the material 5. It also has a frame 17 adjacent to the roller conveyor 16 with more rolls 18 for material support of material bars of larger lengths, wherein the distance between the rolls 18 in the material feed direction 9 can be considerably larger than the roll spacing of roller conveyor 16. Of course, both the rolls of roller conveyor 16 and rolls 18 rotate, driven if necessary, about axes that are essentially horizontal and perpendicular to the material feed direction 9.

On the material discharge side of the system containing the cutting machine 1, a short roller conveyor 19 that is supported by the frame of the cutting machine 1 extends, initially, to the machine table 7. Downstream of this conveyor and the frame of the cutting machine 1 is a table frame 20 a short distance away in the material feed direction that has an offload table in the form of a roller conveyor 21 that lines up with roller conveyor 19, next to this and perpendicular to the material feed direction is a table plate 22, and on the side opposite the table plate 22 next to the roller conveyor 21 is a slide gate 23 on the table frame 20 that can travel horizontally, perpendicular to the material feed direction. The effective surface of this slide gate facing the offload table 21 is formed by a roller conveyor 24 extending in the material feed direction that has rolls which rotate about vertical axes that are perpendicular to the material feed direction. The roller conveyor constituting the offload table 21 can be shifted on table frame 20 by a drive unit, not shown, in the material feed direction so that it can be moved up against the roller conveyor 19 starting from the position shown in FIGS. 1 and 3, but can also be brought to positions lying between these two extreme points using the automatic controls of the system.

Furthermore, as seen in particular in FIGS. 1 and 4, the gripping jaws 12, 13 are connected to a support 25 that is horizontal and extends perpendicular to the material feed direction and that is located outside the material cross section, below roller conveyor 19. By means of rolls 26, 27, the ends of the support 25 are engaged with guide tracks 28, 29, which are formed by slots in coulisse walls 30, 31 fastened to the frame of the cutting machine 1. The guide tracks 28, 29, which are identical to one another, have a horizontal section 32, as is especially illustrated by FIG. 2, that extends in the material feed direction, an adjacent curved section 33 that curves upward and a vertical section 34 adjacent to that.

This design makes it possible to move the gripping jaws 12, 13 together with the material piece 14 held by them away from the cutting plane 8 and, by rotating 90°, upward in order to then discharge the material piece 14 with its most recently cut surface onto the offload table 21. In this manner, the drive system for the support 25, and thus for the gripping jaws 12, 13 makes use of a drive means attached to the coulisse walls 30, 31, which is not shown here and is also incorporated into the automatic control system for the cutting machine 1, in a known manner, for which an example will be explained in more detail later with the help of FIGS. 20 and 21.

As for the individual sections 32 through 34 of the guide tracks 28, 29, the length of section 32 must be chosen such that the gripping jaws 12, 13 come away sufficiently from the cutting machine 1 in order to then be able to design the tilting motion resulting from the curved section 33 of the guide tracks 28, 29 to be collision-free. On the other hand, the length of section 34 of the guide tracks 28, 29 must be selected so that the gripping jaws 12, 13 together with the workpiece 14 held by them maintain sufficient upward distance from the surface level of the offload table 21.

So that the gripping jaws 12, 13 and their support 25 can make the motion shown along the guide tracks 28, 29 away from the cutting machine 1 collision-free, the roller conveyor that forms the offload table 21 is first returned to the position seen in FIGS. 1 and 3 that is farthest from the cutting machine 1. If then the gripping jaws 12, 13 and their support 25 are located on the section of the guide tracks 28, 29 formed by the vertical section 34, the roller conveyor that forms the offload table 21 can be moved in the direction toward the cutting machine 1 below the gripping jaws 12, 13 and below the material piece 14 held by them. Then, the gripping jaws 12, 13 and their support 25 are moved downward along the vertical section 34 of the guide tracks 28, 29 until the most recently cut surface of the material piece 14 sits on the surface of the offload table 21. After this, the gripping jaws 12, 13 are opened, moved a bit upward if needed along vertical section 34 of the guide tracks 28, 29 and then the roller conveyor that forms the offload table 21 and the material piece placed on it are returned to the position seen in FIGS. 1 and 3. This frees the path for the gripping jaws 12, 13 and their support 25 to return to the position seen in FIGS. 1 through 4 next to the cutting plane 8 and to grip there the material piece that is the next to be cut and that had in the meantime been fed forward by the feed jaws 10, 11 prior to the beginning of the next cut.

Now as this next cut is made, the material piece located on the offload table 21 can be pushed onto the table plate 22 to a position predetermined by the control system of the slide gate 23 by moving the slide gate 23 in a direction perpendicular to the material feed direction. This once again frees up the offload table 21. However, it is also possible to leave the material piece on the offload table 21 so as to discharge onto or next to it subsequent pieces which are then placed onto the table plate 22 together with the help of the slide gate 23. In this way, the stroke of the slide gate 23 can be set to different final positions such that the result is a number of material pieces or rows of material pieces extending in the material feed direction lying next to one another on the table plate 22 perpendicular to the material feed direction.

In FIGS. 1 and 3, the slide gate 23 is shown in an intermediate position that can serve to laterally guide long material pieces in a manner yet to be described. If, on the other hand, short material pieces 14 are placed in the manner described above from the cutting plane 8 onto the offload table 21, the slide gate 23 is located in a position at a distance from the offload table 21 beyond the coulisse wall 31 so that the gripping jaws 12, 13 and their support 25 can travel unhindered along the guide tracks 28, 29.

As seen especially in FIG. 4, the gripping jaws 12, 13 are arranged such that the effective surface of gripping jaw 13 facing the material 5 is fixed or can be moved back from the material with only a very short stroke motion, whereas gripping jaw 12 moves perpendicular to the direction of the material feed in a known manner, which is not shown in more detail, to open and close the gripped condition. In this way, to better guide long material pieces to be cut, a roller conveyor 35 is also supported off of the gripping jaw 13, said conveyor extending in the material feed direction out from the cutting plane. The rolls of this roller conveyor rotate about axes that are vertical and perpendicular to the material feed direction. As seen in particular in FIG. 1, roller conveyors 24 and 35 can be positioned in alignment with one another by correspondingly adjusting the slide gate 23, the purpose of which is to guide long material pieces.

Catch bins 36 can be positioned in the space between the frame of the cutting machine 1 and the table frame 20, in particular beneath the end of roller conveyor 19 in the case of a known process by the system containing the cutting machine 1 of not transporting shorter material pieces by means of the gripping jaws 12, 13 in the manner shown but by pushing them onto roller conveyor 19 by the feed motion of the material 5 for the next cutting step and discharging them in the material feed direction by operating the roller conveyor 19.

Below, the individual steps of the method of removal of short material pieces using the gripping jaws 12, 13, illustrated above according to the invention, are illustrated once again with the help of FIGS. 5 through 18. FIGS. 5 through 12 correspond to the representation according to FIG. 1 in excerpted form and FIGS. 13 through 18 correspond to an enlarged sectional representation of FIG. 1.

Figure 5:
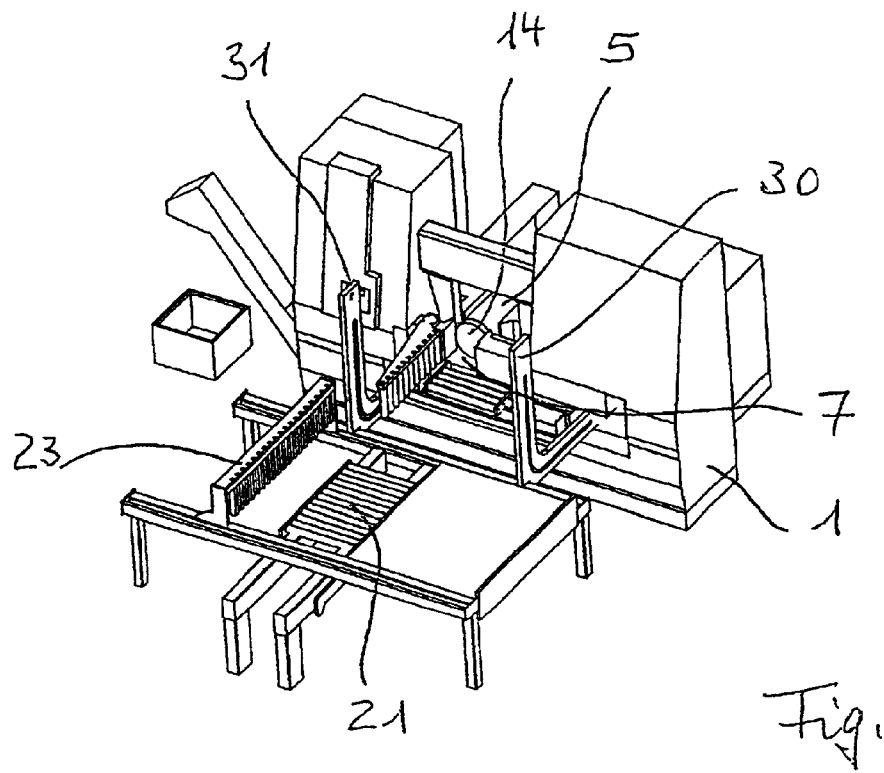
FIGS. 5 through 12 are simplified perspective views according to FIG. 1 to illustrate the method involved in the cutting off of a short workpiece.

FIG. 5 shows the state in which a short material section 14 has just been cut from the material bar 5 by the saw band 2, the cutting strip of the saw band 2 having thus reached the surface of the machine table 7. The offload table 21 is located at a position away from the frame of the cutting machine 1 and the slide gate 23 is at a distance from the offload table 21 such that it is away from the coulisse wall 31 as seen from this position.

Figure 6:
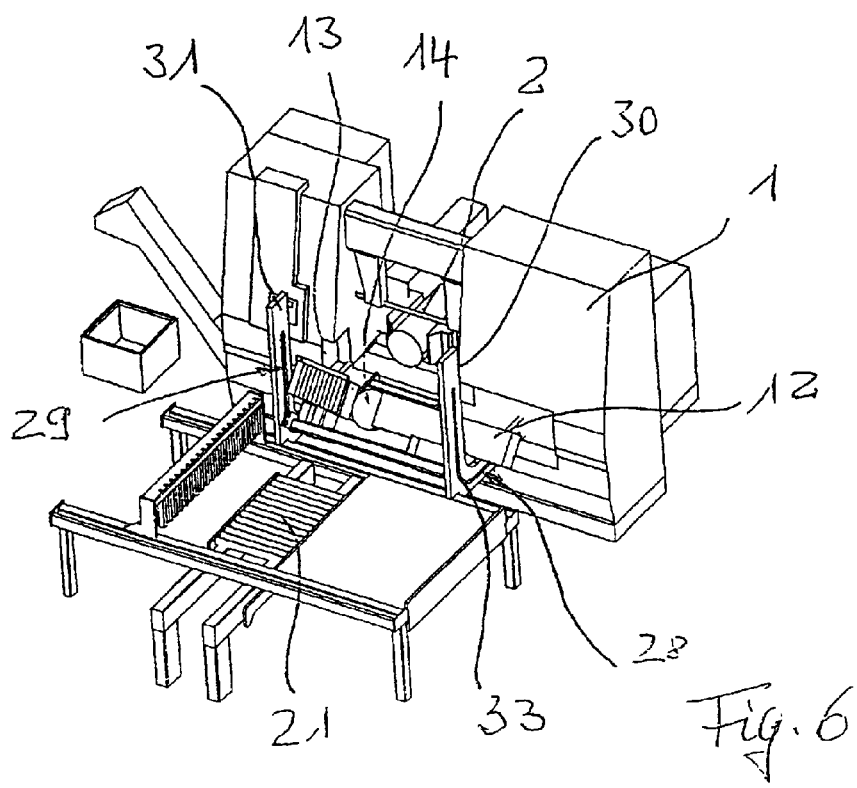
Figure 7:
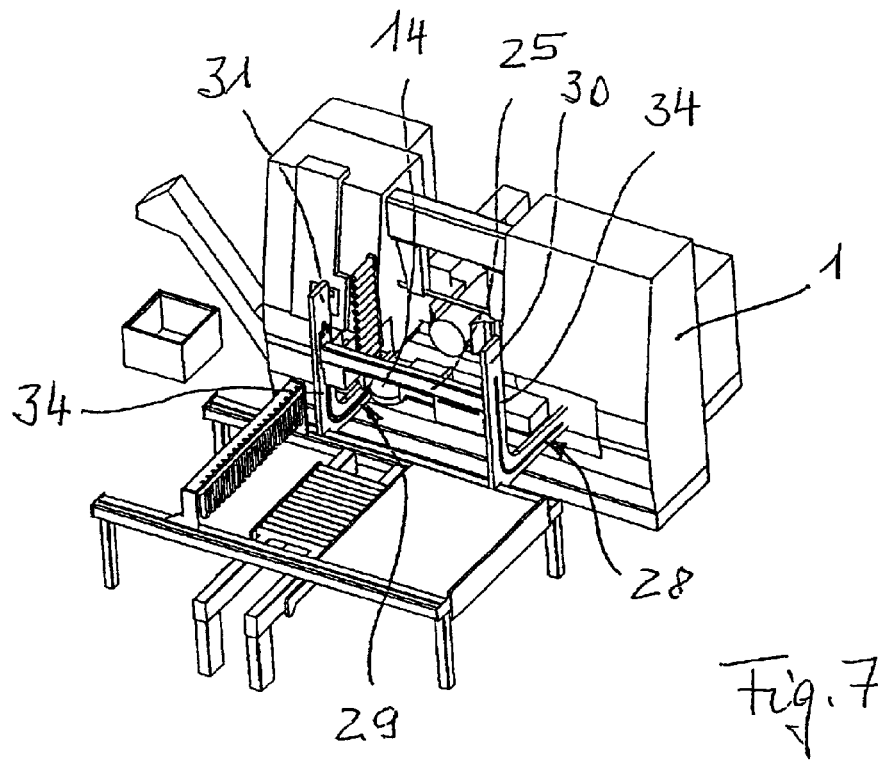
Figure 8:
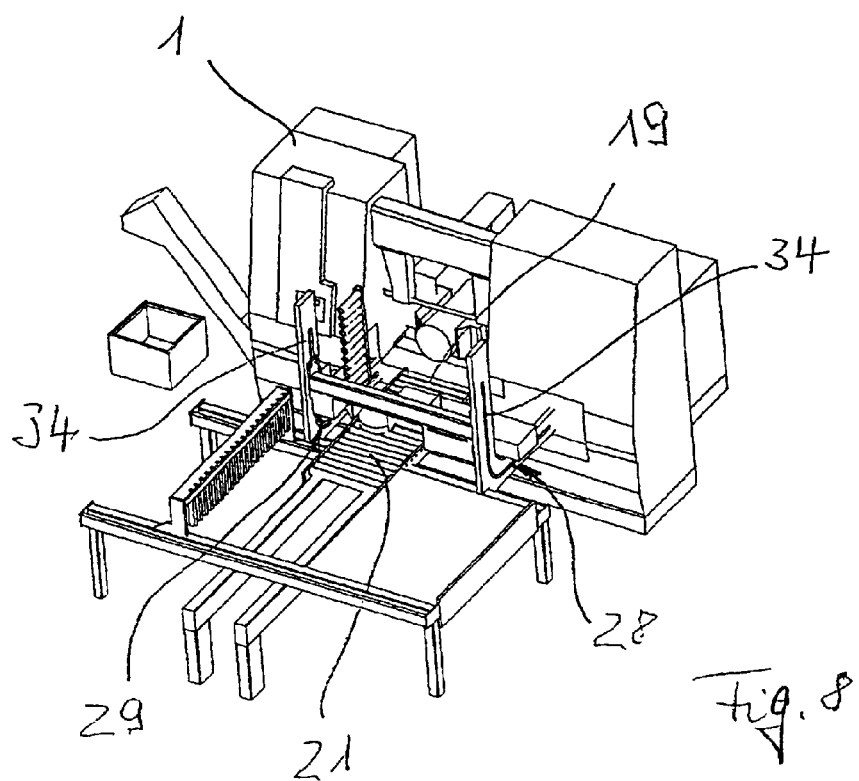

The gripping jaws that hold the material piece 14 are now set into motion in the material feed direction 9 along the guide tracks 28, 29 formed by the coulisse walls 30, 31 and, as seen in FIG. 6 are tilted by virtue of the curved section 33 of the guide tracks 28, 29 such that the most recently cut surface of the material piece 14 begins to assume a position facing downward. At the end of this motion, as seen in FIG. 7, the gripping jaws 12, 13 and their support 25 are on the vertical section 34 of the guide tracks 28, 29 shifted far enough upward that, as seen in FIG. 8, the offload table 21 can then be moved forward in the direction opposite to that of the material feed 9 up to the short roller conveyor 19.

Then, the gripping jaws 12, 13 together with their support can move downward on the vertical section 34 of the guide tracks 28, 29 by automatic control and can discharge the material piece 14 onto the offload table 21. At that point, the gripping jaws 12, 13 are opened to release the material piece 14, the gripping jaws and their support 25 are then moved again upward a bit on the vertical section 34 of the guide tracks 28, 29 and the offload table 21 and the material piece placed on it are returned to the position away from the frame of the cutting machine 1 in the material feed direction 9. This state is seen in FIG. 9.

While this is happening, as shown in FIG. 6, the cutting strip of the saw band 2 is again moved upward away from the perpendicular section of the material 5.

Figure 9:
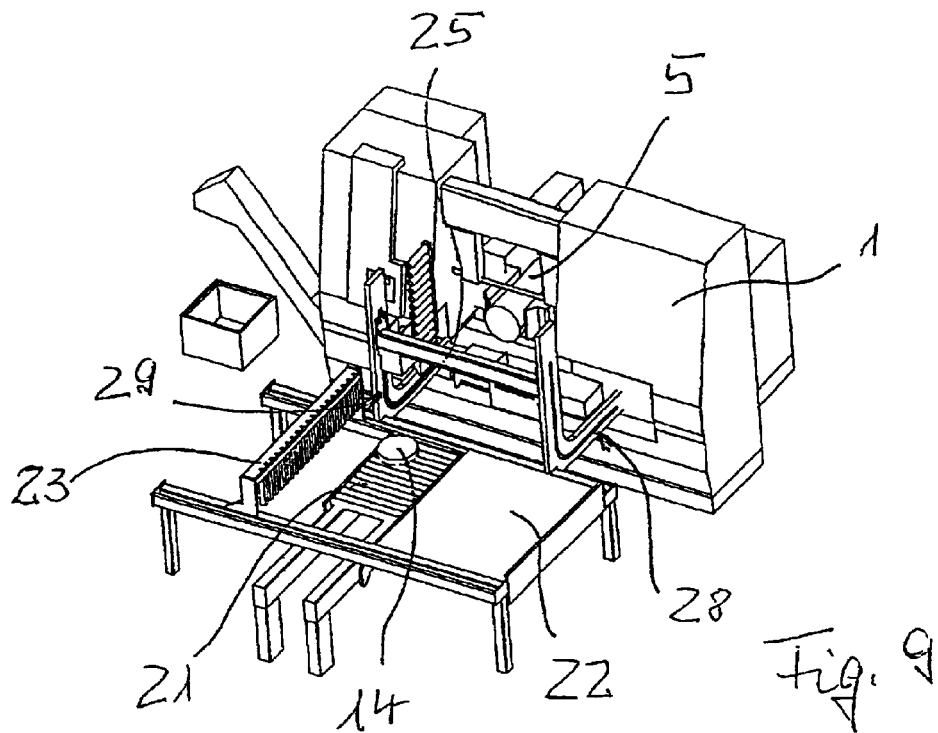
Figure 10:
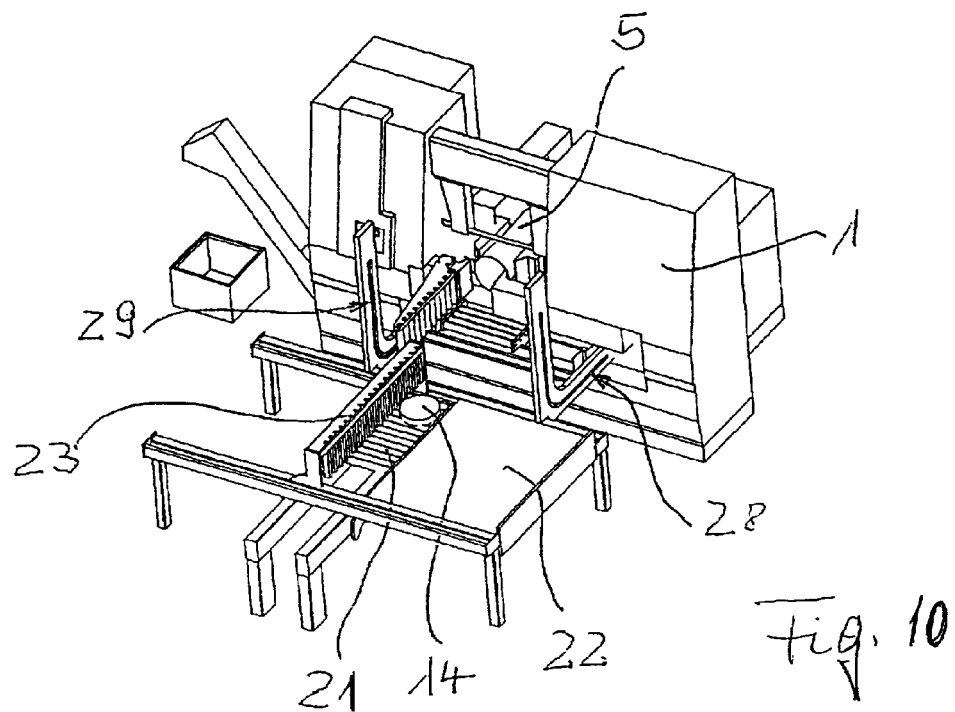

Now, the gripping jaws 12, 13 and their support 25 return from the position illustrated in FIG. 9 to their position directly next to the cutting plane 8 along the guide tracks 28, 29, as seen in FIG. 10. During this, the gripping jaw 13 is shifted away from the material 5 by a short stroke in the manner described with the help of FIG. 4, so as to not collide with the end of the material extending beyond the cutting plane 8. Then, as shown in FIG. 10, the path for the slide gate 23 is free for it to shift the material piece 14 from the offload table 21 onto the table plate 22. This shifting motion ends, as seen in FIG. 11, when the material piece 14 has arrived at the end of the table plate 22 farthest from the offload table 21.

Figure 11:
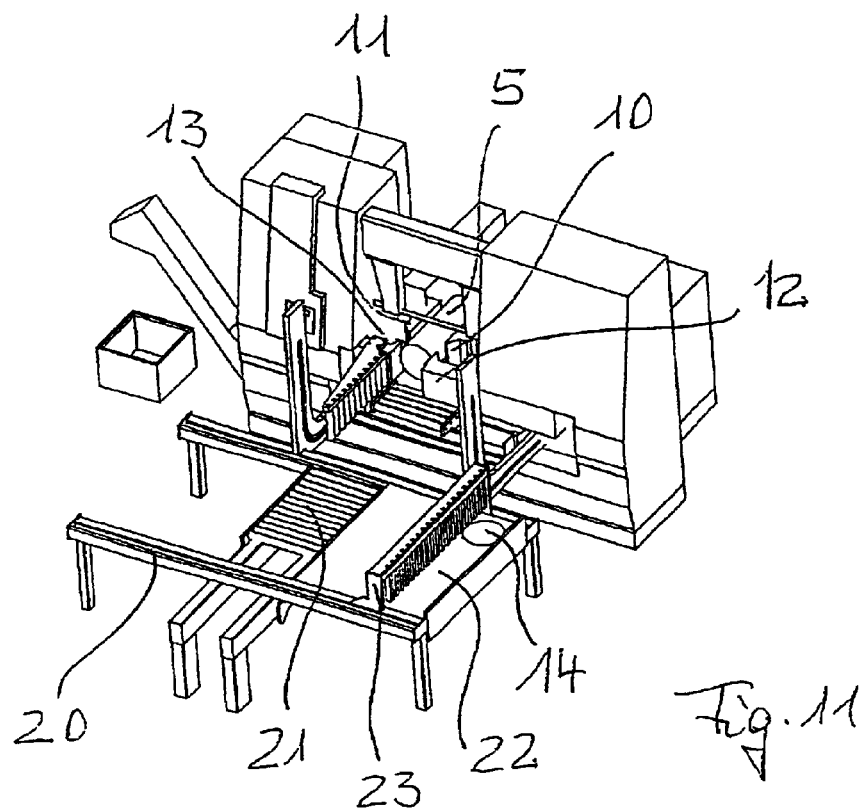

Simultaneously, as also seen in FIG. 11, the workpiece 5 could also be pushed forward by the feed jaws 10, 11 in the material feed direction 9 by the length of the material piece to be cut off next and this next material piece could be held by the gripping jaws 12, 13.

Figure 12:
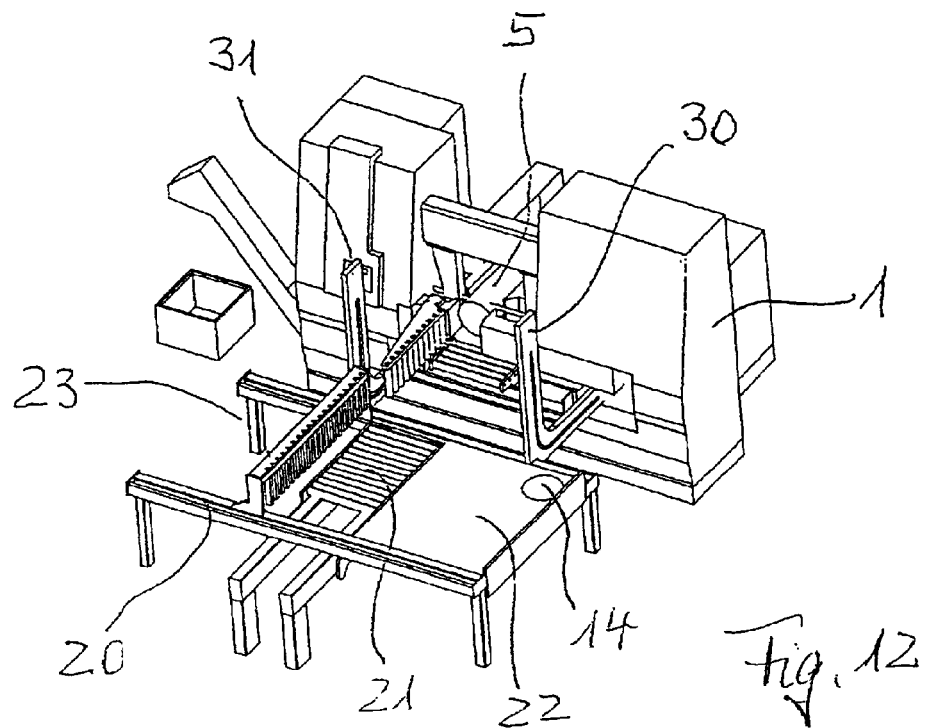
Figure 13:
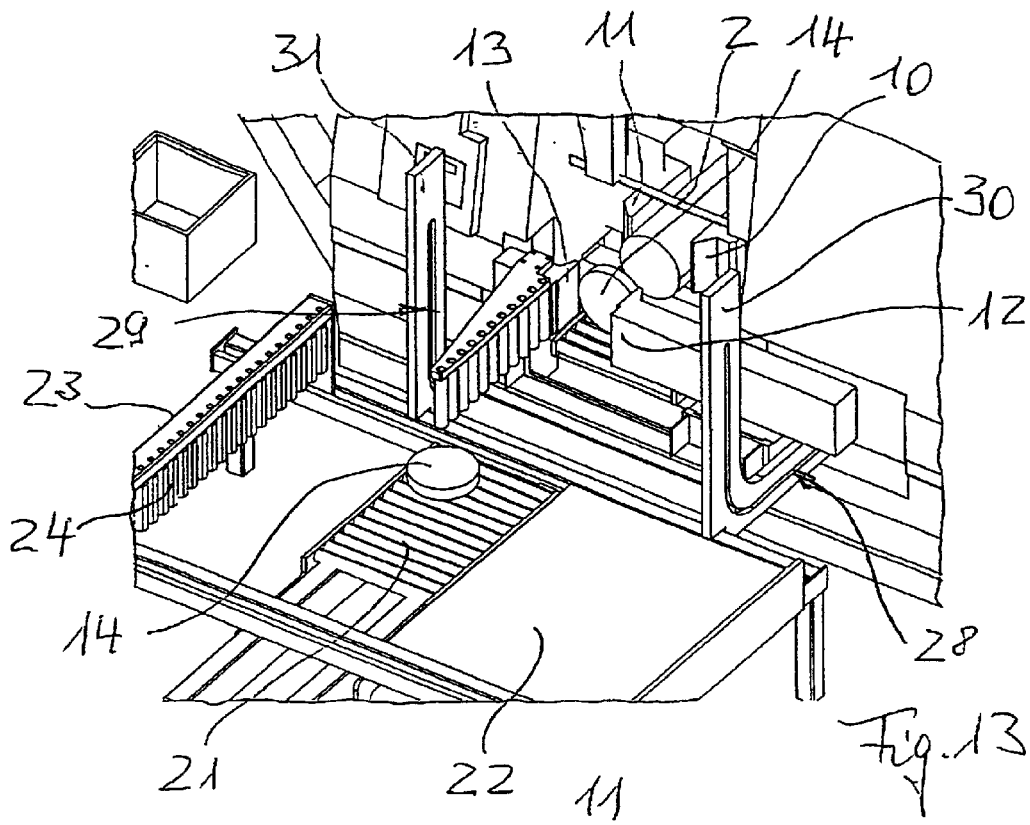
FIGS. 13 through 18 are enlarged perspective views according to FIG. 1 to illustrate the method involved in the cutting off of another short workpiece.
Figure 14:
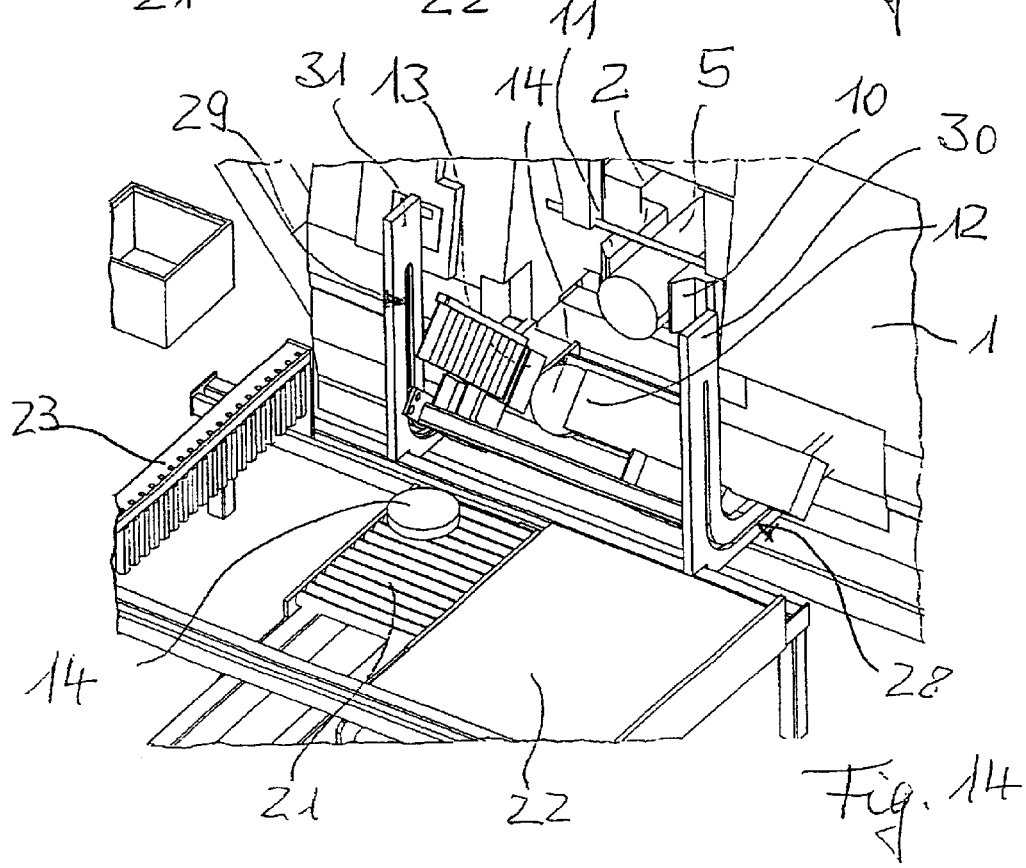
Figure 15:
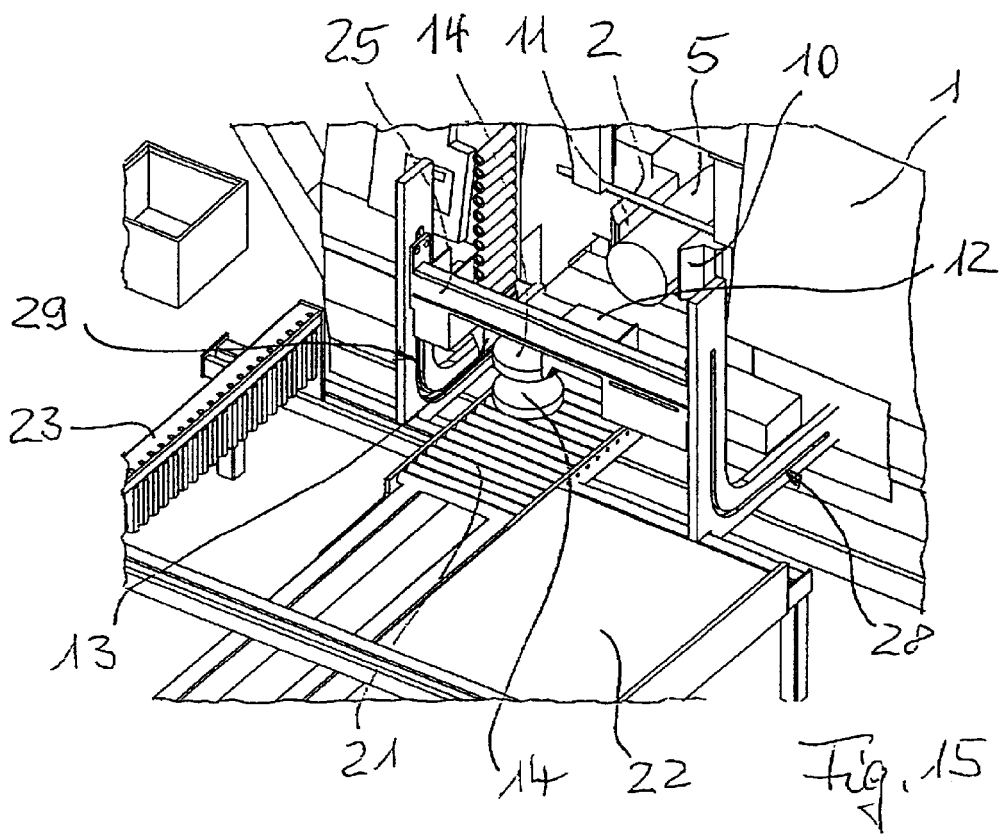

Then, the next cutting step begins, as shown in FIG. 12, and the slide gate 23 returns back to its position away from the coulisse wall 31 as seen in FIGS. 5 through 9.

With the help of FIGS. 5 through 12, the method according to the invention was illustrated using an individual material piece that had been moved immediately by the slide gate 23 onto the table plate 22 after being positioned on the offload table 21.

Figure 16:
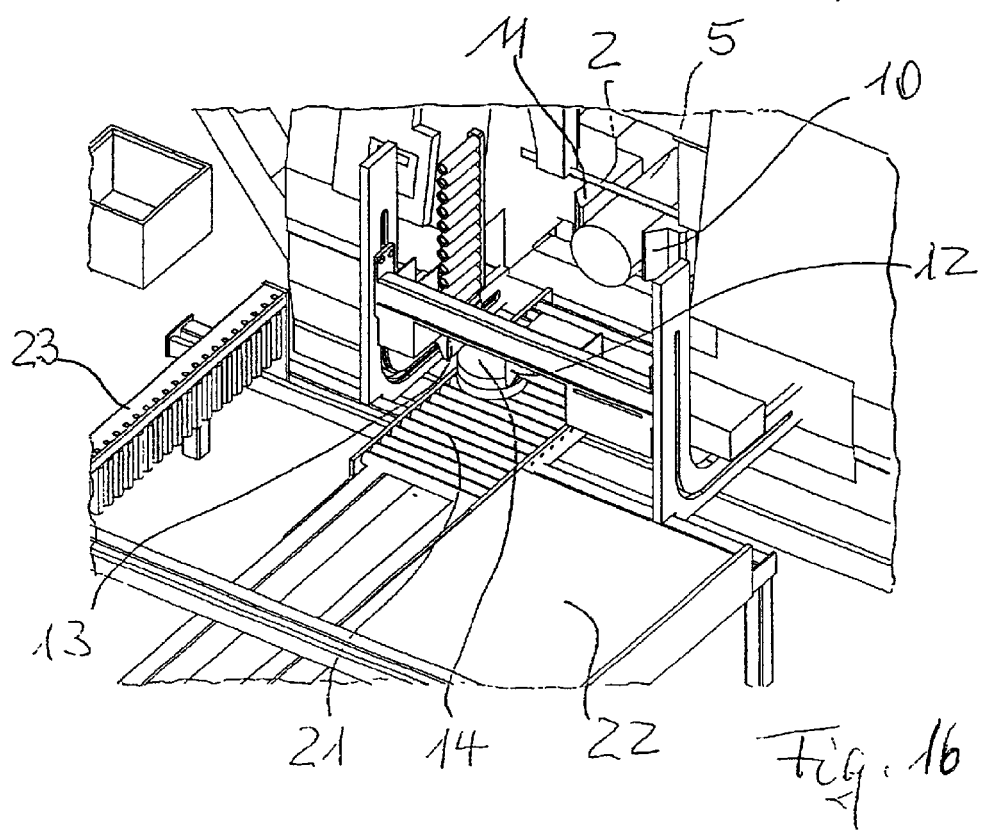
Figure 17:
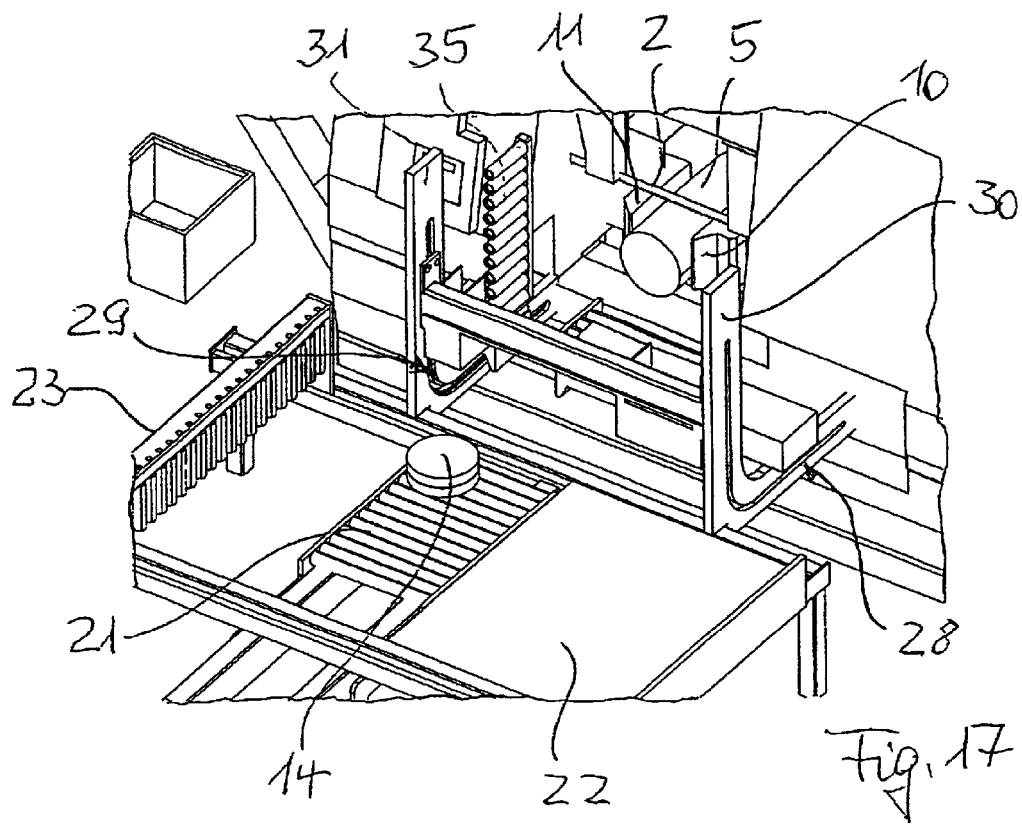
Figure 18:
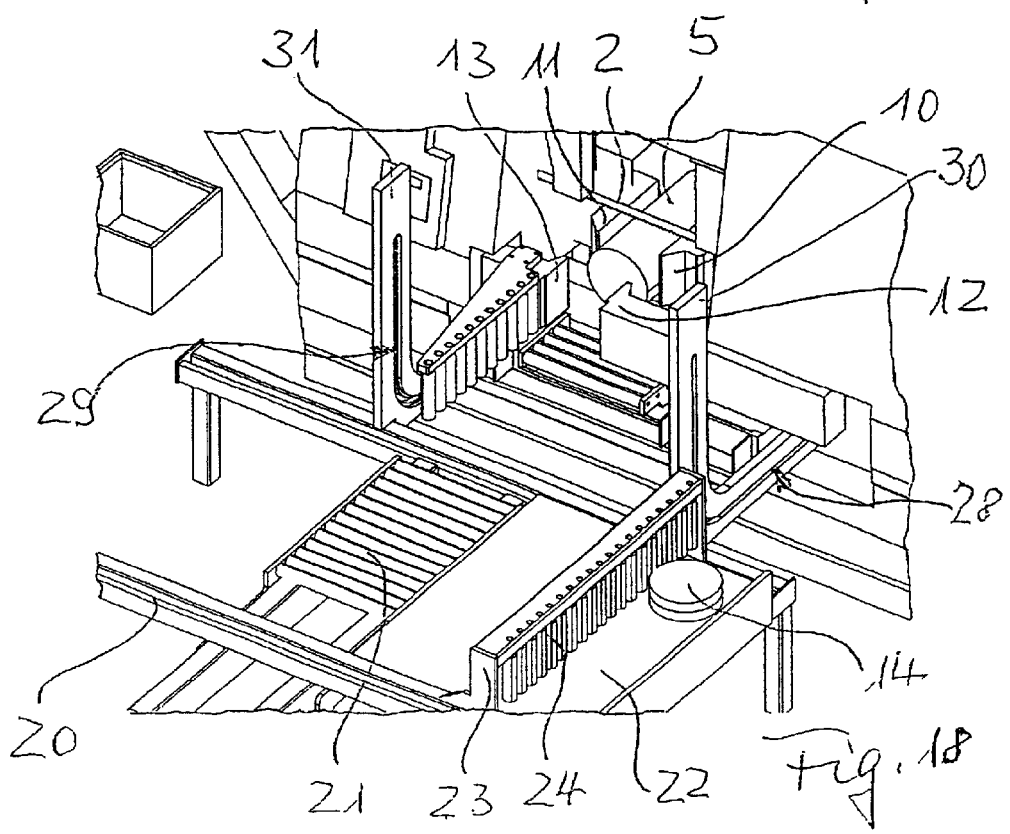

However, there is also the possibility of leaving this first material piece 14 on the offload table 21 so as to stack more material pieces onto it. This process is shown in FIGS. 13 through 18 in connection with a second material piece 14, wherein reference is made to the description of FIGS. 5 through 12 concerning the handling of the material to avoid repetition. Of interest is the views according to FIGS. 15 through 18, which show how the second material piece is first held by appropriately positioning the gripping jaws 12, 13 above the first material piece, and then according to FIG. 16 is discharged onto it. Then, FIGS. 17 and 18 show the shifting of the stack formed of two material pieces by the slide gate 23 from the offload table 21 down onto the table plate 22, in an analogous manner to FIGS. 10 and 11. Of course, all motions of the machine parts in connection with these steps are controlled by the computer system for the cutting machine, taking into account the perpendicular cutting of the material 5 and the thickness of the slices formed from the material piece.

Of course, larger stacks of material pieces 14 can also be formed, whereby it is only necessary to design the vertical section of the guide tracks 28, 29 as long as needed.

Another possibility is to move the offload table 21 through computer control toward the cutting machine 1, starting from its position farthest removed from the frame of the cutting machine 1 and ending at different positions in this direction, which will depend on the perpendicular cut of the material. This permits numerous material pieces 14 to be discharged next to one another on the offload table 21 in the material feed direction 9. This, then, can lead to the result seen in FIG. 19, by appropriately activating the slide gate 23, which shows numerous stacks of material pieces next to one another lying in the material feed direction. However, FIG. 19 also illustrates that by appropriately controlling the slide gate 23 perpendicular to the material feed direction, numerous stacks of material pieces can be positioned next to one another on the table plate 22 by then making a shorter stroke of the slide gate 23 along the table plate 22 through computer control.

FIG. 19 illustrates, moreover, the known process when cutting off long material pieces 15. These pieces are already located at least partially on the short roller conveyor 19 during the cutting step and if necessary on the roller conveyor that forms the offload table 21, wherein the latter can also assume a position moved at least partially in the direction toward the cutting machine 1. If the material piece 15 has been cut, it can be further conveyed in the material feed direction to a sorting unit 37 adjacent to the table frame 20 by correspondingly operating roller conveyor 19 and the roller conveyor that forms the offload table 21. This sorting unit provides for the collection and sorting of the material pieces on both sides of their feed path using a slide gate 38 that moves perpendicular to the material feed direction.

Finally, FIG. 19 illustrates how this feed motion is accomplished for material pieces 15 by means of the roller conveyor 35 connected to gripping jaw 13. As opposed to the representation in FIG. 19, roller conveyor 24 located on the slide gate 23 can also be brought to a position that lines up with roller conveyor 35 to provide further support.

According to the previous representation and description, in particular with the help of FIG. 4, it was shown that gripping jaws 12, 13 are located on a support 25 whose ends in turn are engaged with the guide tracks 28, 29.

According to FIGS. 20 and 21, another possibility can be that gripping jaws 12, 13 are each located above a vertical upright 38, 39 that is below a support 40 and that each of the free lower ends of the uprights 38, 39 is engaged with one of the guide tracks 28, 29 corresponding to its gripping jaw 12, 13. In this way, FIG. 20 shows that this engagement is accomplished by means of rolls 43, 44 that rotate at the ends of the upright 38, 39 and that cooperate with the walls 41 of the slots 28, 29 and with the coulisse walls 42.

Figure 20:
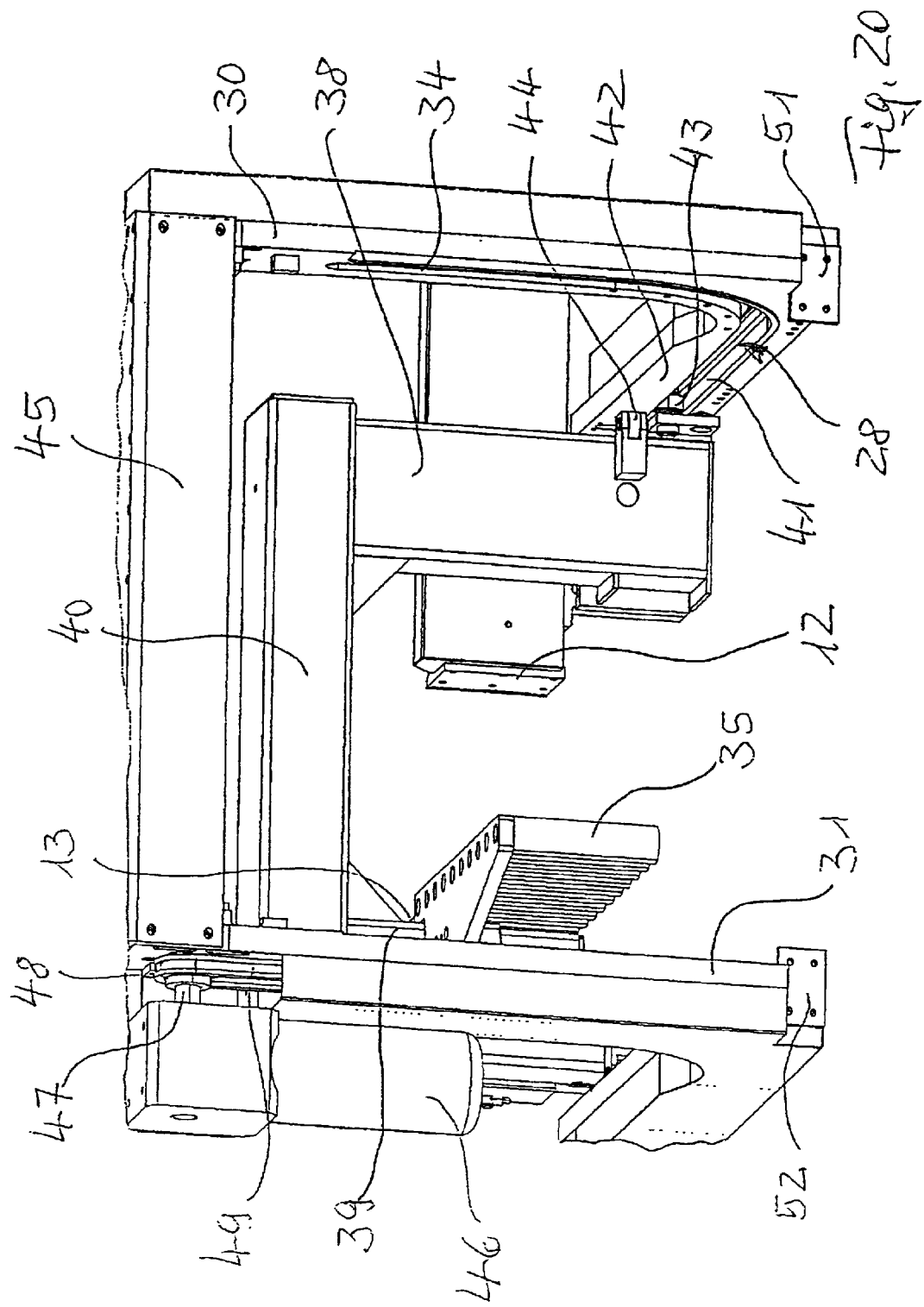
FIG. 20 is a detailed perspective view of the system according to FIGS. 1 through 4, with a design variation.

FIGS. 20 and 21 also show, in a simplified representation, the drive unit to move the unit comprised of the gripping jaws 12, 13, the uprights 38, 39 and the support 40 along the guide tracks 28, 29 designed into the coulisse walls 30, 31. In addition, the coulisse walls 30, 31 are connected together beyond the upper end of the vertical section 34 of the guide tracks 28, 29 by means of a horizontal bridge 45 that extends perpendicular to the material feed direction 9. This bridge contains a shaft 47 driven by a rotating motor 46, with the shaft supporting a return pulley 48 to a drive means 49 on each of the outer sides of the coulisse walls 30, 31 away from the gripping jaws 12, 13 that winds around the respective guide track 28, 29. These drive means permit the longitudinal ends of the uprights 38, 39 to be at least directly connected as indicated in FIG. 21 by 50 so as to produce the motion of the gripping jaws 12, 13 along the guide tracks 28, 29 by means of the drive means 49 by operating the shaft 47 accordingly.

FIGS. 20 and 21 illustrate very well how the coulisse walls 30, 31, which are attached to the cutting machine 1 at one end, which is in the back here, have attachment plates 51, 52 at their other bottom end, by means of which they are bolted to the table frame 20.

The embodiment, shown in FIGS. 20 and 21, for the drive unit to move the gripping jaws 12, 13 along the guide tracks 28, 29 is equally well suitable to drive the unit comprising the gripping jaws 12, 13 and support 25, which is shown in FIGS. 1 through 19 and in particular in FIG. 4. In FIGS. 1 through 19, the representation of this embodiment is, however, left out for reasons of clarity of the drawing.

What is claimed is:

1. A method to remove pieces cut off from bar-shaped workpiece material using a sawing machine, wherein a piece of the material to be cut off, lying on a machine table during the cut behind a cutting plane in a direction of material feed, is gripped between gripping jaws from behind the cutting plane only, and after the cut is made, gripping the cut piece (14) and moving it away from the cutting plane (8) using a second set of gripping jaws (12, 13) that grip opposing edges of the cut piece and move in the material feed direction (9) and then upwardly to tilt about an axis perpendicular to the material feed direction (9) such that a most recently cut surface of the cut piece is generally horizontal and facing down, and discharging the piece (14) onto an offload unit (21) by moving the gripping jaws (12, 13) generally vertically downward.

2. A method according to claim 1, further comprising moving the material piece (14) located on the offload unit (21) farther away from the cutting plane (8) in the material feed direction (9).

3. A method according to claim 1, further comprising moving the material piece (14) located on the offload unit

(21) to a predetermined collection position by a horizontal motion directed perpendicular to the material feed direction (9).

4. A method according to claim 1, further comprising placing a number of material pieces (14) on top of one another on the offload unit (21) and then moving them to a collection position together.

5. A method according to claim 1, further comprising discharging the material pieces (14) onto the offload unit (21) in offload positions laid out next to one another in the material feed direction (9) and then moving them to a collection position together.

* * * * *